May 25, 1937.  K. E. PEILER ET AL  2,081,859
APPARATUS FOR FORMING GLASSWARE
Filed Oct. 13, 1932    6 Sheets-Sheet 4

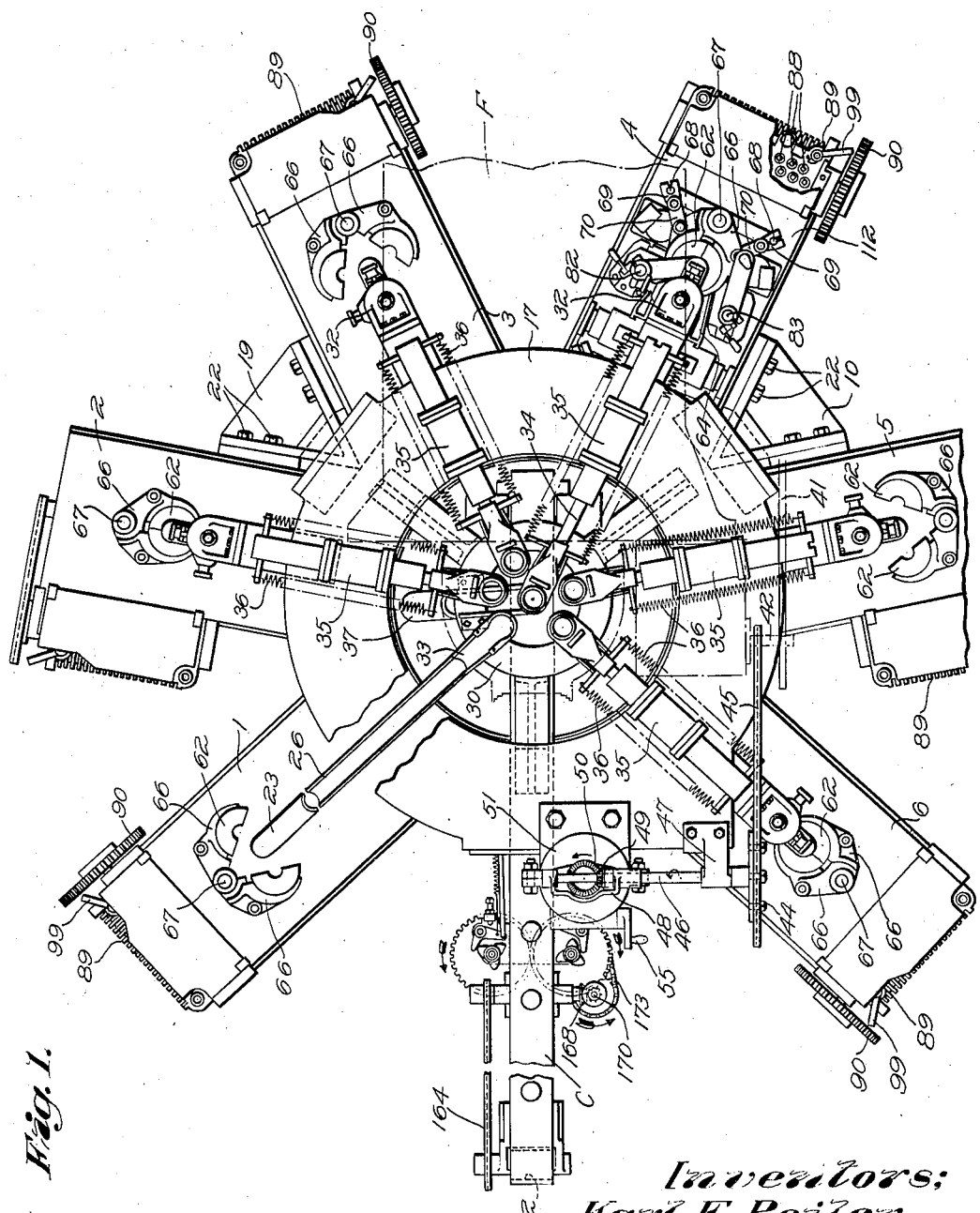

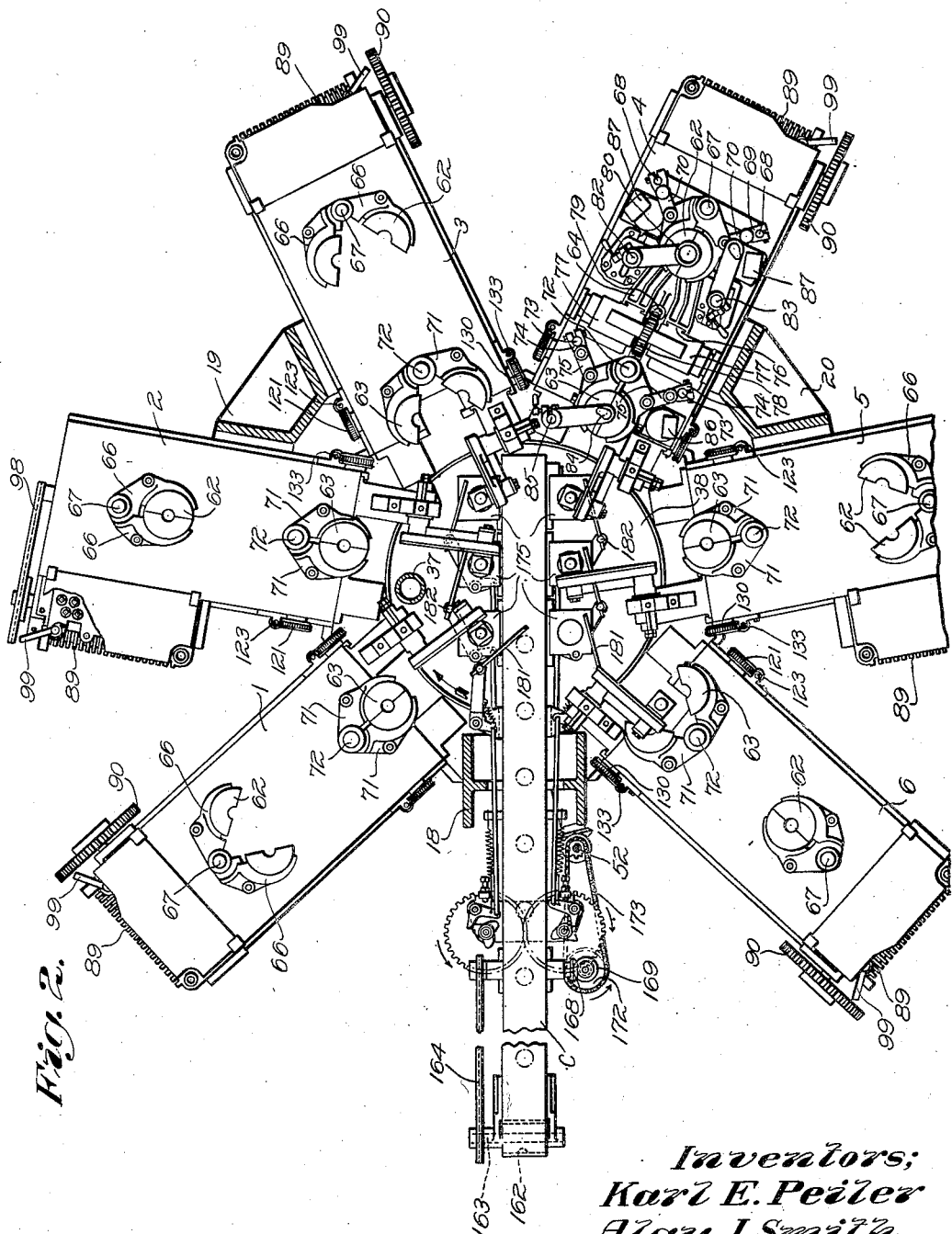

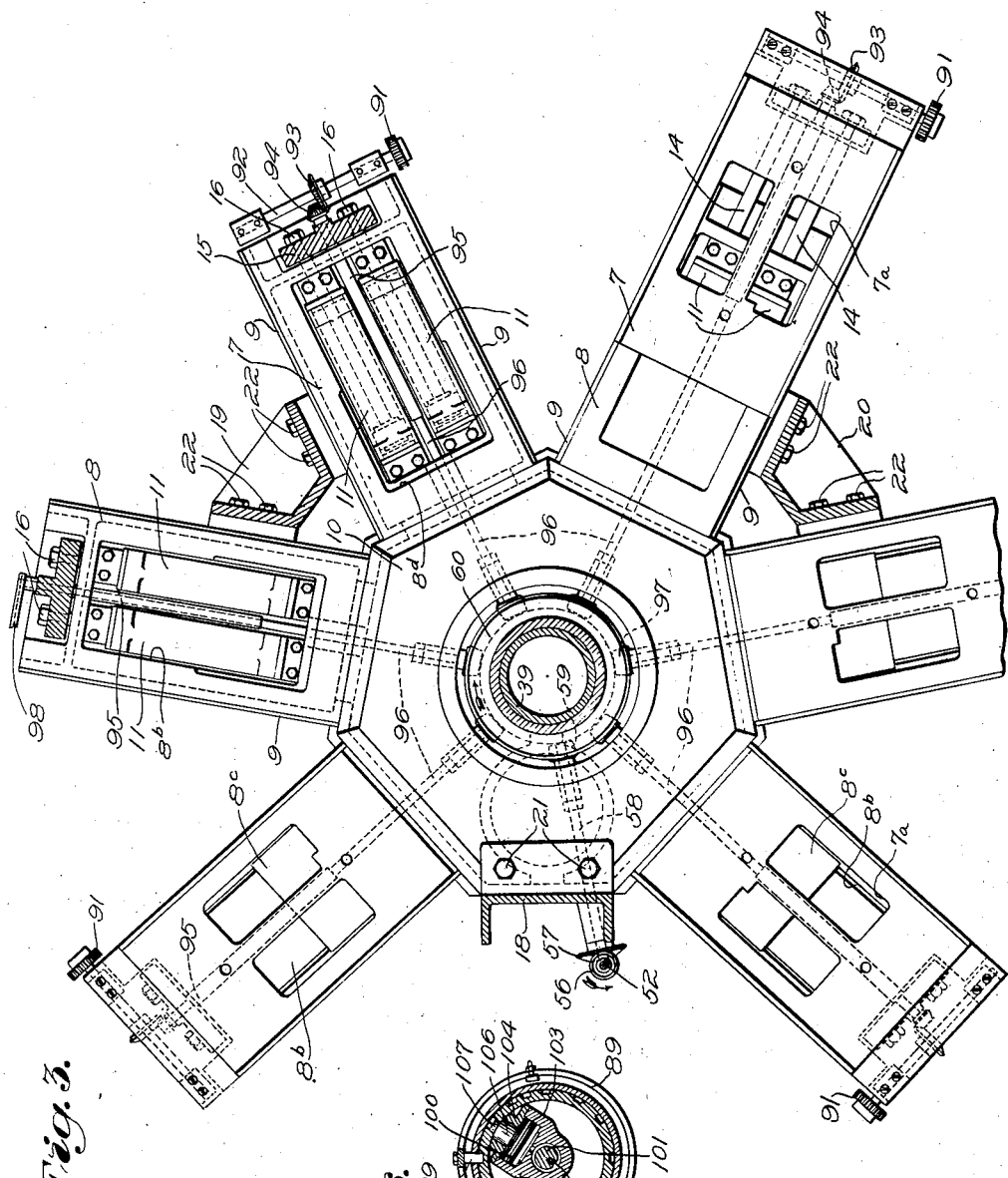

Witness:
W. B. Thayer.

Inventors;
Karl E. Peiler
Algy J. Smith
by Brown & Parham
Attorneys

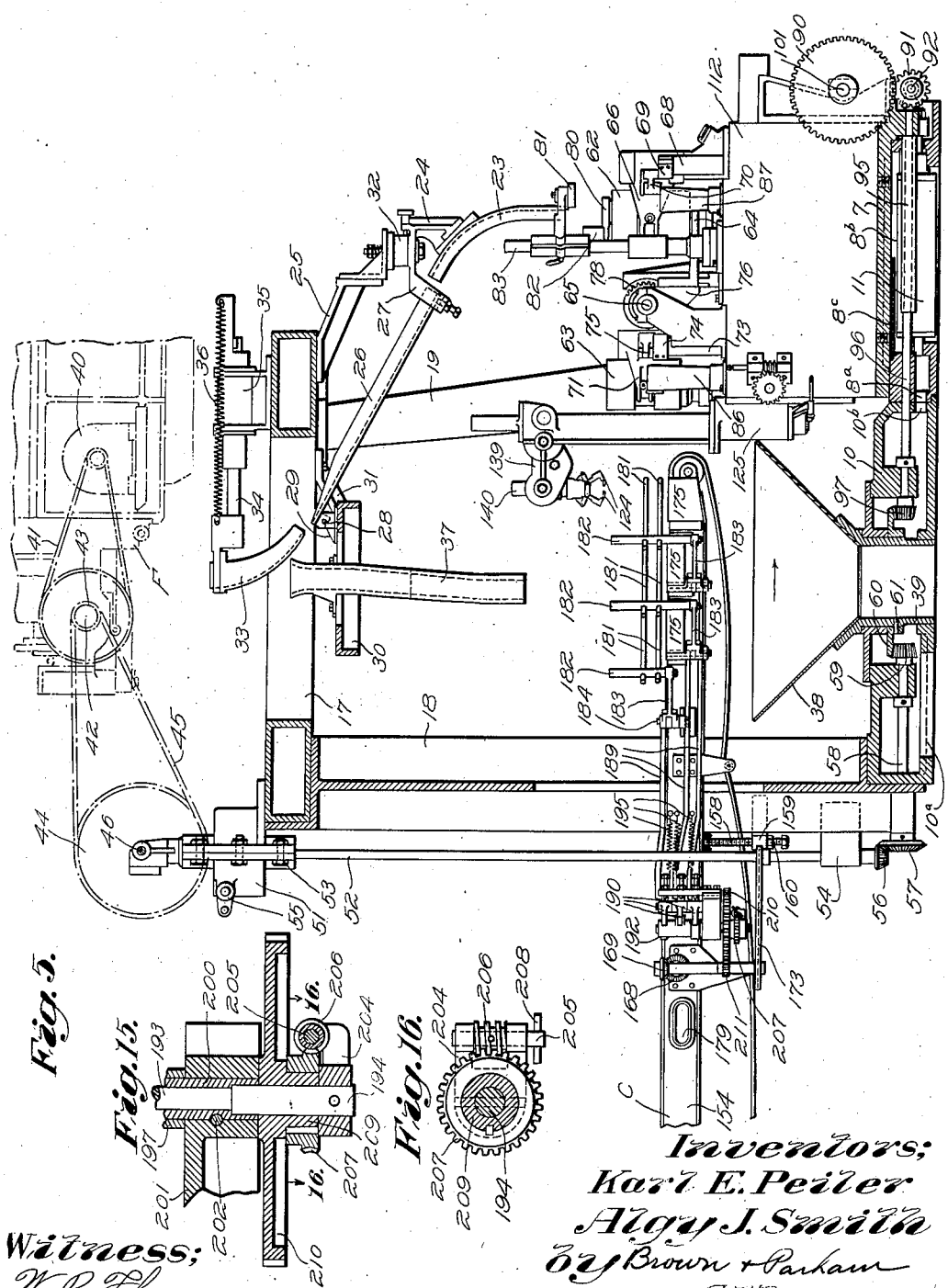

May 25, 1937.  K. E. PEILER ET AL  2,081,859
APPARATUS FOR FORMING GLASSWARE
Filed Oct. 13, 1932   6 Sheets-Sheet 6
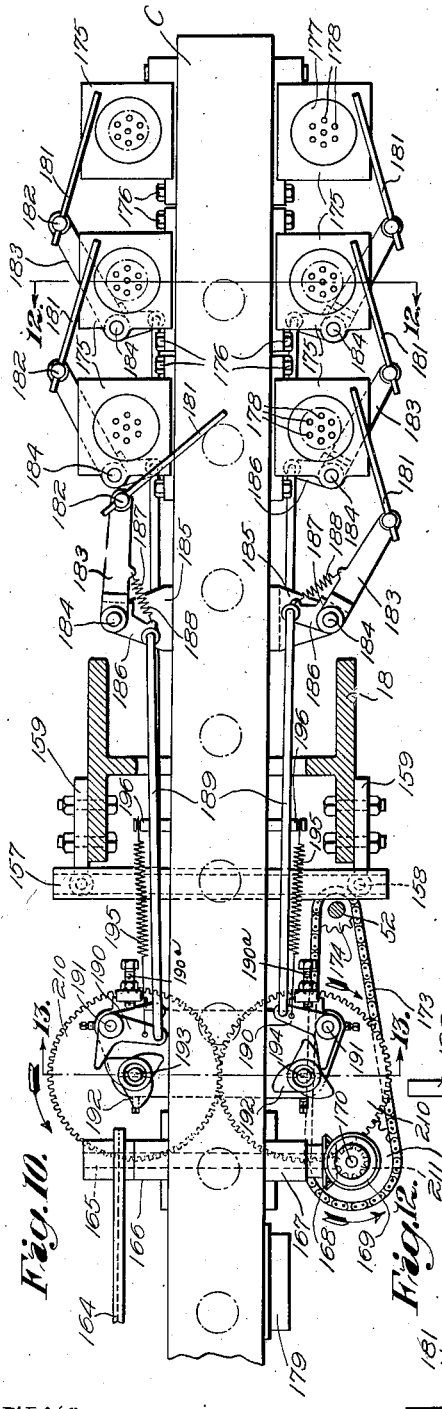
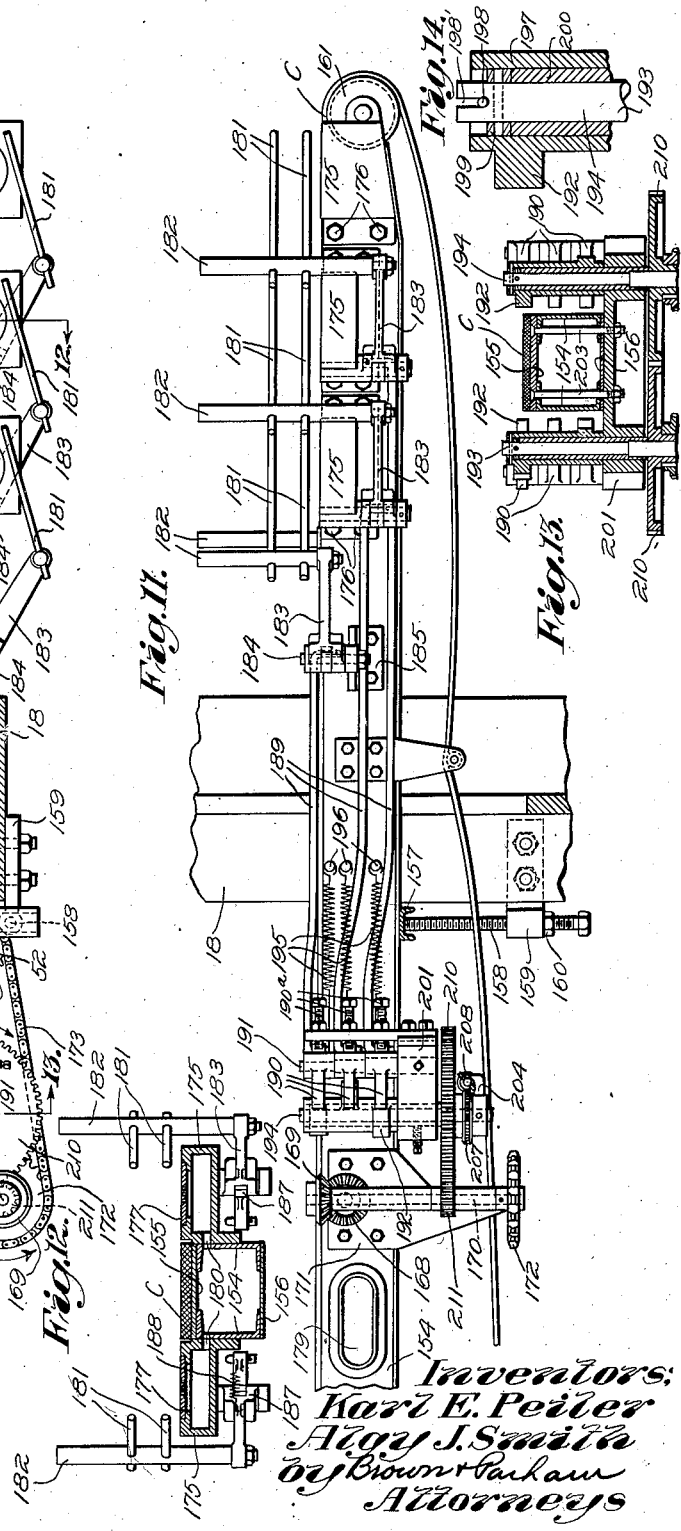

Patented May 25, 1937

2,081,859

UNITED STATES PATENT OFFICE 2,081,859

APPARATUS FOR FORMING GLASSWARE

Karl E. Peiler, West Hartford, and Algy J. Smith, Bloomfield, Conn., assignors to Hartford-Empire Company, Hartford, Conn., a corporation of Delaware Application October 13, 1932, Serial No. 637,602

15 Claims. (Cl. 49—5)

This invention relates to apparatus for forming glass articles, such as bottles, and more particularly to apparatus of this character, comprising a plurality of similar and preferably autonomous glass forming units, each of which may be of the character of those now employed in the commercial machines known as the "Hartford I. S." (independent section) machines. Certain of the basic principles of construction and operation of this "I. S." machine are disclosed in the Ingle Patents 1,843,159 and 1,843,160, both granted Feb. 2, 1932. Certain other of the basic principles of this machine are disclosed and claimed in the patent to Peiler (one of the present co-inventors) 1,826,019, granted October 6, 1931. A somewhat more improved form of the machine, substantially that now in commercial use, is disclosed and claimed in the copending application of Henry W. Ingle, Serial No. 275,093, filed May 4, 1928, now Patent No. 1,911,119, granted May 23, 1933, and entitled "Glassware forming machine".

In the previously patented forms of this machine, and also in the machines which have been constructed and are now in commercial use, four similar units have been assembled together as a unitary machine. It has been found in practice that this four-unit machine has been substantially the equivalent in productive capacity to some six-unit machines of the rotary type also in commercial use at the present time. It is desired, however, to increase the productive capacity of a machine of this general type which may be supplied with glass from a single feeder so as in the normal course of operation, as will be hereinafter set forth, the machine will be capable of utilizing the entire feeder capacity, which has not been the case with many of the prior art machines. At the same time it is desired to provide a machine having the maximum possible flexibility in operation, that is, a machine which is potentially capable of producing a greater variety of sizes and shapes of articles and at desired speeds up to the speed capacity of the machine.

Among the objects of the present invention, therefore, are to provide a glassware forming machine and article handling mechanisms associated therewith by which a high degree of flexibility is available and in which a high potential machine speed is obtainable for manufacturing glass articles, and to provide such an organized system of machine, feeder, and article handling means as will permit of the most economical scheduling arrangements for the factory operations, while at the same time providing a machine having all of the inherent advantages of the present commercial "Hartford I. S." machine.

A further object of the present invention is to provide a machine of the type above referred to in which the units as a whole occupy fixed predetermined positions rather than rotate, thus conserving in the amount of power required to operate the machine and reducing wear and resultant upkeep costs.

A further object of the present invention is to provide a machine of the character described in which provision is made for moving any of the individual units from their respective operative positions to some other positions, at which access may be had to their several parts for repair, replacement or adjustment.

A further object of the present invention is to provide a plural unit machine in which all of the units are grouped in predetermined positions about a central point or zone and are adapted to be supplied with glass charges from a single glass feeding device and in which the charges are supplied to the blank molds of the several units, which molds are located at points horizontally more distant from the center point or zone of the group of units than are the associated blow molds of the respective units in which the articles being formed are given their final shape, so that articles may be removed from all the units toward the region centrally thereof and preferably also so that mechanical take-out means may be employed to remove articles from the final blow molds of the several units and place them upon a single conveyor passing through or from the region centrally of the grouped units for conveying the finished articles to a desired point, which in practice will be adjacent to the ware-loading end of an annealing lehr.

A further object of the present invention is to provide a plural unit machine of the character above set forth in which provision is made for synchronizing the feeder, the machine, and the takeout and conveying mechanisms, so that each may operate in properly timed relation with respect to the others and so that articles will be delivered by the conveyor in evenly spaced relation both as to distance apart on the conveyor and as to the increments of time between the arrival of successive articles at a predetermined point to which they are moved by the conveyor; and further to provide arrangements whereby any number of units less than the whole number provided may be operated in uniformly distributed time relation so that all of the charges supplied by the feeder associated therewith may be distributed to the units remaining in operation and no charges be lost to cullet and so that the same conditions of delivery of the finished articles by the conveyor as to the space therebetween on such conveyor may be had, as in the case where all the units are in operation.

A further object of the present invention is to provide takeout and conveying means for the completed articles formed by a machine, as above set forth, in which there are provided dead plates adjacent or contiguous to the conveyor having means for cooling the finished articles placed thereon, thus including in the present organized machine and manufacturing and handling arrangements for the ware all the advantages present in the device disclosed in the copending application of Ingle, Serial No. 418,524, filed January 4, 1930 now Patent No. 1,921,390, granted Aug. 8, 1933 and entitled "Glassware conveyor".

A further object of the present invention is to provide preferably centrally of the grouped units, a cullet funnel for directing charges of glass supplied by the feeder and not distributed to one or another of the several units to a suitable receiving point, as some point beneath the floor upon which the machine is located, or on a lower floor in the plant, such cullet funnel being rotated while the machine is in operation for the purpose of presenting a relatively cool surface to each of the charges of glass directed eccentrically thereinto, whereby to prevent any portion of the funnel being heated to such an extent by contact with the hot glass delivered thereto that the glass will adhere to the funnel.

A further object of the present invention is to provide in an organized machine of the character described, a cullet funnel serving as a link in the mechanical chain of driving mechanisms intermediate the feeder and the several units of the machine so that, for example, the feeder drive may be connected to rotate the cullet funnel and the rotation of this funnel may be in turn employed to drive the timing means for each of the several units.

Further and more detailed objects and advantages of the present machine and organized arrangement of mechanisms for feeding, forming and handling the ware being made will become more apparent from a reading of the following specification and sub-joined claims when taken in connection with the accompanying drawings, in which:

Figure 1 is a plan view of a machine embodying our invention, a glass feeder for supplying glass charges to the several units of the machine being indicated in dot-and-dash lines to show the relation between the feeder and the machine, and certain parts being omitted or broken away to show some of the details of construction;

Fig. 2 is a plan view, in many respects similar to Fig. 1, showing the mold arrangements for the several units and the relative arrangement of the units, and the take-outs and article-conveying means for the completed articles, certain of the details of the forming mechanism of one unit being shown in full, and the other units being shown merely diagrammatically;

Fig. 3 is a view, partly in plan view and partly in horizontal section, of certain of the base structures for the machine, showing particularly the means for moving the units into and out of their operative positions and certain of the means for synchronizing the timing of the mechanisms of the individual units with the feeder and other operating mechanisms for the device;

Fig. 5 is a view partly in elevation and partly in vertical section showing the relation of the feeder to one unit of the machine group, and showing also the cullet disposal means and the take-out and conveyor means for the machine;

Fig. 6 is a detail view in vertical section showing the means for adjusting the timing of one of the timing drums for an individual forming unit;

Figure 9:
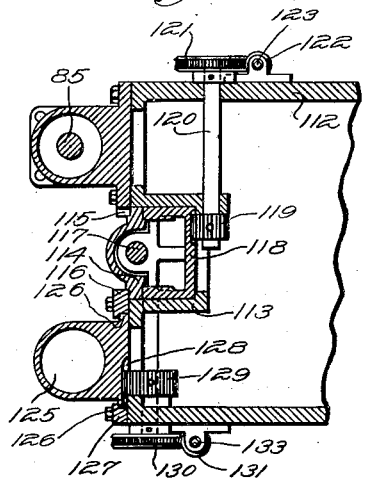

Fig. 9 is a fragmentary view, principally in horizontal section showing certain of the adjusting means for the final blow bottom plate and the take-out for one of the forming units, and particularly showing certain differences between the construction of these parts of the forming units of the present machine and those of the units of the machine shown in the Ingle Patent No. 1,911,119, above referred to:

Fig. 10 is a view principally in plan showing the removal conveyor for the finished articles and the dead plates and push-offs associated therewith;

Fig. 11 is a view principally in elevation of the parts of the device shown in Fig. 10;

Fig. 12 is a view in vertical section taken on the line 12—12 in Fig. 10;

Fig. 13 is a view in vertical section taken on the line 13—13 in Fig. 10;

Fig. 14 is an enlarged fragmentary view, principally in vertical section, of a portion of the device shown in Fig. 13;

Fig. 15 is a view, principally in vertical section and on an enlarged scale, of a portion of the phase changing device shown in Fig. 11; and Fig. 16 is a view, partly in horizontal section and partly in plan, taken on the line 16—16 in Fig. 15.

As will be hereinafter more fully set forth, the machine of the present application is a six-unit machine in which the six units are grouped about a common point in a substantially radial arrangement and in which there are provisions for operating any number of units from one up to six in evenly spaced time relation, so as to utilize all the charges of glass supplied by a feeder which preferably supplies its charges at a place in vertical alignment with the point about which the units are grouped. Also there are means for automatically handling the completed articles from all the units in operation irrespective of the number of such units which are in operation up to the total number of units and for delivering such articles upon the conveyor in evenly spaced relation thereon.

A machine of this character lends itself admirably to a novel factory set-up by which extremely economical factory planning and production scheduling operations may be had. For example, we may consider as a glass manufacturing unit, a tank of approximately 40 tons capacity in 24 hours associated with which are three feeders, each supplying charges of glass to a machine of the type hereinafter to be described in detail. In some installations, it may however be found desirable to replace one or more of these three machines by a machine of the "Hartford I. S." type as set forth in the Ingle Patent No. 1,911,119 above referred to. From each of these machines a conveying system leads to a suitable delivery point at which there may be located an automatic stacking mechanism of the type disclosed in the patent to Lorenz, No. 1,878,156, issued September 20, 1932, which will receive articles from a predetermined point upon the conveyor and stack them upon the conveying belt of a glass annealing lehr, which may be of the type disclosed in the patent to Mulholland, No. 1,560,481, granted November 3, 1925. Thus, there will be three stackers and three lehrs, one for receiving the articles produced by each of the three machines. All these devices together may be considered a manufacturing unit from the point of view of the plant as a whole. The entire plant may have as many of these units as its production requires.

Turning now to the reasons underlying a set-up of the type suggested, it is well known that glass furnaces operate most efficiently at a given production expressed in tons of glass made per day of 24 hours. If it is attempted to make more glass than this amount, the quality of the glass falls and may reach a point such that the glass will be unfit for use in the manufacture of commercial articles. On the other hand, if this predetermined amount of glass is not drawn from the tank, the cost per ton drawn rises to a material extent. Thus, from the point of view of the manufacturer, it is desirable that the tonnage pull upon each tank in his factory for every 24 hours be substantially uniform. The forming machine costs represent a smaller proportion of the cost of a single completed article, than do the costs of producing the glass necessary for that article. Thus, if a greater forming machine capacity is available than is used at all times, the loss in this case is much less than would be the case if the tank were operated at an efficiency lower than its maximum. For this reason, it is desired to have excess forming machine or mold capacity and to leave some of this capacity idle at times, rather than materially to vary the pull on the tank expressed in tons of glass per 24 hours. The machine of the present application lends itself admirably to such an arrangement in that it has a high degree of flexibility and more specifically in that one or more of the forming units of the machine may be maintained out of operation and the remaining units maintained in operation to use all the glass delivered by the associated feeder. Furthermore, in this way the pull of glass through the various feeders may be maintained fairly uniform irrespective of changes required in scheduling of the plant. Thus the flow of glass through the tempering chamber of the tank immediately preceding the forehearths, with which the respective feeders are associated, may be maintained relatively constant resulting in better glass (with the exception of the short time during which a job change is being made).

As a practical matter, it may be advantageous in operating a tank of the capacity above referred to (40 tons per 24 hours) to have each feeder operating to produce mold charges of a given weight range. Thus, for example, with the devices above referred to, feeder A may produce charges with a weight range of 2½ to 9 ozs., feeder B, 9 to 15 ozs., and feeder C, 15 to 26 ozs. (These feeders and the tank are not shown on the drawings.)

As above set forth, it is desired to have the forming machine capacity usually greater than that of the predetermined tank capacity and more specifically it has been found that probably the best arrangement is to have the forming machine capacity such that when all the forming units of the three machines are in operation, the entire tank capacity will be drawn if the articles being made are at the lowest end of the several weight ranges for the several feeders. Thus, for example, if feeder A is delivering mold charges of 2½ ozs. and the machine associated therewith is operating at a speed of 11 articles per mold unit, per minute, feeder A will deliver 7.428 tons of glass in 24 hours. Similarly, with all 6 mold units in operation the machine associated with feeder B will form the lightest articles in its predetermined range for this feeder, to wit, 9 oz. articles at a speed of 6.3 articles per mold unit, per minute. Feeder B will then deliver 15.312 tons of glass in 24 hours. At the same time, feeder C may deliver the lightest weight charges in its predetermined range, namely 15 oz. charges of glass. The machine associated therewith may be in full operation as to all 6 units, each at a speed of 4.5 articles per minute; feeder C will then supply 18.228 tons of glass in 24 hours. Thus, all three feeders will supply 40.968 tons of glass in the 24 hours.

Suppose now with the same apparatus, it is desired to manufacture articles of 2¾ oz. weight on the machine associated with feeder A, 11½ oz. weight on the machine associated with feeder B and 22½ oz. weight upon the machine associated with feeder C. The machine speeds in terms of articles per mold unit per minute will be respectively 10.7, 5.4 and 3.7. The tonnage from feeders A, B and C will be 7.926, 13.975 and 18.730 tons of glass per 24 hours, or a total of 40.631. In this set-up, the machine associated with feeder A will have all 6 of its units in operation, and the machines associated with feeders B and C will each have one unit idle, or 5 units in operation. Thus with only two mold units idle out of the 18 available, the draw on the tank will be 40.631 as against 40.968 with all units in operation upon minimum weight charges for the several operating ranges of the three feeders. Many other examples could be given to show how a great variety of different weight articles may be made at an economical speed of manufacturing, and with the draw upon the tank maintained substantially constant, at least within the economical operating range and with one or more of the forming units idle in order to balance the actual draw on the tank to that desired.

The actual production now being made in a commercial operating plant has been taken as a basis and a schedule laid out for a proposed plan, comprising a plurality of manufacturing units, each of the type above set forth, and the actual draw upon the several tanks has been maintained by proper scheduling very close to the desired efficient rate of tank operation to prove the practicability of this plan.

The real success of the plan lies in the ability of retiming the units of the forming machine with respect to their associated feeder and with respect to the article handling mechanisms employed so as to utilize all the charges of glass supplied by the feeder in one or another of the operating units of the forming machine, while at some times maintaining one or more forming units out of operation as may be necessary to obtain an even pull on the tank and at the same time presenting the completed articles upon the takeout conveyor for delivery to the stacking and annealing devices used in uniform spaced relations so that they may properly be handled by an automatic stacker, thus providing a completely automatic manufacturing process. In this way, great economies are effected in manufacturing, due to the lower cost of producing the glass required for manufacturing the articles for which orders are obtained, while at the same time the quality and speed of manufacturing those articles is as good, or better, than in any previously known manufacturing arrangement.

Turning now to the apparatus, particularly forming the subject-matter of this application, Figs. 1 and 5 there is indicated at dot-and-dash lines at F, a glass feeding device which may be of the type disclosed in a patent to Peiler 1,760,254, granted May 27, 1930 for Apparatus for feeding molten glass, or may be of any other desired type. The particular construction and operation of the feeding device F form no part of the present invention and hence will not be described in detail.

The machine of our present invention comprises a plurality, in this case six, of forming units indicated generally by the numbers 1 to 6 respectively. Each of the forming units 1 to 6 may be, and preferably is, of the general type disclosed in the Ingle Patent No. 1,911,119 above referred to, with certain changes which will be hereinafter more fully described in detail. The forming units are arranged in a group about a common center or point and are preferably disposed in a substantially radial arrangement about this point, although the angular spacing between the center lines of adjacent units may be unequal. Also, it is not essential that the center lines of the several units be exactly radial of any one point. The group arrangement of the several units is for the purpose of permitting these units to be supplied with charges of glass from a single source, as the feeder F, preferably by chute systems to be described in detail hereinafter, which will be as near similar as possible so that charges arriving at each of the several units may be in substantially the same condition upon arrival.

*Base construction and movement of units as a whole*

Each of the units 1 to 6 is suitably secured to a base member 7 (Figs. 3 and 4) which is mounted for sliding movement upon a sub-base 8, suitable guideways indicated at 9 being provided for retaining the base 7 in proper position upon the sub-base 8. The several sub-bases 8 are suitably secured at their inner ends to a main base casting 10, preferably by cap screws (not shown).

Figure 4:
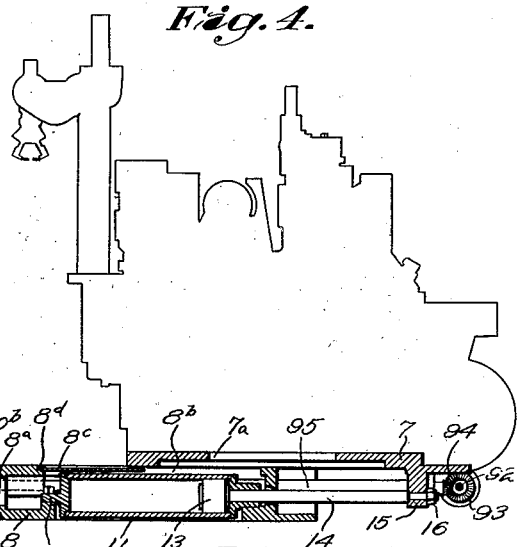
Fig. 4 is a fragmentary view, principally in vertical section, and showing a forming unit in outline only, which illustrates particularly the driving means for the timers of the individual units and the means which move the units into and out of operative position.

Means are provided for moving the individual units 1 to 6 into and out of their operative positions, here shown as a movement in a substantially radial direction with respect to the center of base 10. Such means in the present instance include a pair of fluid pressure cylinders 11 for each unit, these cylinders being secured to the sub-base 8 at their inner ends, as indicated at 12 (Fig. 4). Pistons 13 in the cylinders 11 are provided with piston rods 14 secured to the base 7 at 15, as by providing the outer ends of the rods 14 with reduced portions passing through a suitable downward projection of the base member 7 and provided with nuts 16 threaded on such reduced portions at their outer ends. Fluid pressure may be supplied to the opposite ends of the cylinders 11 by any suitable manually operated valve mechanism (not shown) for moving the units between their operative or inward positions and their inoperative or outward positions, at which latter access may be had to the several parts of the units for replacement, repair or adjustment.

*Charge distributing means*

Means are provided for distributing mold charges separated from the source of glass by the feeder F to the several units of the machine, such means being supported by a main supporting ring 17 (Figs. 1 and 5) which is in turn supported upon three standards 18, 19 and 20 (Figs. 2, 3 and 5). These standards are suitably supported by the fixed base structure, above referred to, standard 18 being secured to the central standard 10 by bolts 21, as indicated in Fig. 3, and standards 19 and 20 being secured between adjacent sub-bases 8 by bolts 22.

Referring now more particularly to Fig. 5, each of the chute systems includes a deflector 23 suitably disposed to direct a charge into the blank mold of its associated unit and supported by a bracket 24 suitably adjustably supported from a bracket 25 which is in turn secured to the supporting ring 17.

The intermediate element of each of the chute systems is an inclined chute 26 supported at its lower end by a bracket 27 which may be a part or extension of the bracket 24 and supported at its upper end upon a suitably pivotal support 28 of a bracket 29 formed upon, or secured to a horizontally disposed ring 30 which is in turn supported from the ring 17 by a plurality of intermediate bracket members 31. The chute member 26 and the deflector member 23 may be suitably adjusted to direct the charges in the desired manner into the associated blank mold by adjusting means indicated generally at 32, such means not being illustrated or described in detail in this application, but are particularly illustrated and described in the Ingle Patent No. 1,911,119 above referred to. The particular character of these adjusting means forms no necessary part of the present invention. The third and last component of the chute system for each forming unit is a scoop or projectable charge interceptor member 33, which is secured to the outer end of a piston rod 34 extending through a pneumatic cylinder 35 which is secured to the ring 17. Fluid pressure may be admitted to the right-hand end of the cylinder 35, as seen in Fig. 5, for projecting the scoop 33 outward from the cylinder, to the left as seen in Fig. 5, to bring this scoop into alignment with the orifice of the feeder F and thus to intercept a charge of glass dropping therefrom and direct it down chute 26 and along the deflector 23 to the blank mold of the associated forming unit. Retraction of the scoop 33 is accomplished through tension springs 36 each secured at one end to a bracket carried by the scoop and at its other end to a suitable fixed anchorage. Thus in the event that the pressure is cut off at any time from the cylinder 35 and exhausted therefrom, the springs 36 will retract the scoop out of alignment with the feeder orifice and to an inoperative position. When any of the forming units is to be thrown out of operation, the lever by which this is accomplished automatically exhausts pressure from the associated cylinder 35 so as to permit the retraction of the associated scoop even should it be at its outermost position at the time the lever is moved.

Cullet disposal means

In the event that any charges of glass are supplied by the feeder F at a time when none of the scoops or charge interceptors 33 of any of the units are in a position to intercept such charges and direct them to their associated units, the charges will fall through a deflecting chute or tube 37 which is suitably secured to the ring 30, as seen in Fig. 5, and will be directed laterally of the removal means for the finished ware, as indicated in Fig. 2, and dropped into a cullet funnel 38, shown in Figs. 2, 4 and 5. The cullet funnel 38 will then deflect the charges down through the sleeve member 39 to which it is secured and preferably down through an aperture in the floor upon which a machine is mounted to some suitable receiving point therebeneath. The subsequent disposition of the cullet forms no part of the present invention.

As seen in Fig. 2, the charges of glass will be received eccentrically of the cullet funnel 38, and in the event that a large number of glass charges were supplied to a single point on the funnel, this point might become so highly heated that the glass would adhere thereto and pile up thereon, thus interfering with the desired operation of the machine and/or of the ware-handling means associated therewith. In order to prevent such an occurrence, the funnel 38 is continuously rotated so that successive charges will be received upon relatively cool portions thereof and thus will not adhere thereto.

A suitable mechanical train is employed to rotate the funnel 38 from an available source of power, which in the present instance is the same source which operates the feeder F, the handling means for the completed articles, i. e., the conveyor, and controls the timing of the several forming units of the machine. As illustrated particularly in Fig. 5, the feeder F may be operated by any prime mover here shown diagrammatically as an electric motor 40. Power for operating the feeder is transmitted from the motor 40 through a suitable sprocket chain 41 to the main feeder drive shaft 42 by which the various operating mechanisms of the feeder are driven. Upon the shaft 42 is a sprocket wheel 43 which is connected to drive a sprocket wheel 44 by a sprocket chain 45. The sprocket wheel 44 is secured to a transverse shaft 46 (Figs. 1 and 5) journaled in suitable bearings in brackets 47 and 48 projecting from and secured to the ring 17. The shaft 46 carries secured thereto a bevel pinion 49 which meshes with a bevel pinion 50 secured to the upper end of a vertical shaft projecting from the differential gear box 51. The shaft 52 projects from the lower side of the box 51 and is journaled in suitable bearings as indicated at 53 and 54. Within the box 51 is suitable mechanism by which a phase adjustment may be made between the shaft upon which the beveled gear 50 is mounted and the shaft 52, this adjustment being accomplished by rotation of the crank 55. Thus the drive from the motor 40 through to the shaft 52 is continuous although the phase relation between the rotation of the motor, and hence the cycle of the feeder and the rotation of the shaft 52, may be varied by turning the crank 55. At its lower end the shaft 52 has secured thereto beveled pinion 56 which meshes with a beveled gear 57 on a horizontal shaft 58 which is suitably journaled in the base member 10. The shaft 58 is provided at its inner end with a beveled pinion 59 which meshes with a beveled ring gear 60 suitably secured to the collar 39, as by one or more pins 61. Thus, the sleeve member 39 and hence the funnel 38 will be continuously rotated as long as the motor 40 and the feeder F remain in operation.

Forming unit, operating and timing means

The forming units of the present machine are each similar to the others, with certain minor exceptions later to be set forth, and are essentially similar to the individual units of the machine set forth in detail in the Ingle Patent No. 1,911,119, above referred to. No claim is made in this application solely to the details of the forming units, and hence only a brief description thereof will be given.

The forming units, illustrated in Figs. 1, 2 and 5, each include a blank mold 62 to which charges of glass are periodically supplied from the feeder F through the chute system above described. Each unit also includes a blow mold 63 in which parisons formed in the blank mold are blown to final form and from which the finished articles are removed by take-out means hereinafter to be described. A third main element of each of the forming units is a means for transferring the partially formed articles or parisons from the blank mold 62 to the blow mold 63. This means comprises a neck ring held in a holder 64 and adapted to be inverted about a horizontal axis 65 intermediate the blank and blow molds, thus simultaneously transferring and inverting the parisons as set forth in the Peiler Patent No. 1,826,019, above referred to. The blank mold 62 is formed of two complementary halves mounted in suitable holders 66, pivoted upon a common fixed vertical axis 67. Means are provided for opening and closing the blank mold, such means including a pair of vertical rods 68 extending upward through the table upon which the blank mold is mounted and having secured thereto, at their upper end portions, cranks 69 connected respectively to the blank mold halves by links 70. Any suitable means, as a pneumatic cylinder (not shown) may be disposed within the structure or table of each unit for simultaneously turning the rods 68 in one direction or the other and thus opening or closing the blank molds when required. The blow mold 63 is likewise made in two cooperating halves, each secured in a suitable holder 71, which holders are pivoted upon a common fixed vertical axis 72, as best illustrated in Fig. 2. Each blow mold is provided with means, similar to the means provided for the blank molds, for opening and closing it at the desired times. Such means include vertical rock shafts 73 to which are secured cranks 74 respectively connected to the mold holders 71 by links 75 (Figs. 2 and 5). It will be understood that the rock shafts 73 are simultaneously operated to open and close their associated blow mold portions or halves in the same way as are the rock shafts 68 for each blank mold, and that the operating means in this case also may be a pneumatic cylinder.

The neck ring itself is not shown as it is hidden by other portions of the device in the views included in the present drawings. The holders 64 for this neck ring, however, are illustrated in Figs. 2 and 5, and are vertically adjustably supported by suitable brackets 76 which are preferably formed integral with a pair of opposing pneumatic cylinders 77 sleeved about suitable pistons mounted upon or forming a part of the shaft 65. Suitable means may be employed, such as springs, for moving the cylinders 77 in one direction (to close the neck ring) and pneumatic means for moving them in the opposite direction (to open the neck ring). The details of construction of these cylinders will be found in the Ingle Patent Nos. 1,843,160 and 1,911,119 both above referred to. Here again, inasmuch as this particular construction forms no necessary part of the present invention, it will not be further described. For inverting the neck rings and their holders and thereby simultaneously inverting the partially formed articles or parisons and transferring them from the position in which they are formed in the blank mold to a position in which the blow mold may be closed therearound, the cylinders 77 and all parts carried thereby are adapted to rotate about the axis of the shaft 65. For this purpose a gear segment 78 is secured to the shaft 65 and is adapted to turn the cylinders 77 and their associated parts. The gear segment 78 meshes with a vertically movable rack 79, seen best in Fig. 2. Suitable means, such as a pneumatic cylinder (not shown), may be employed for operating the rack 79 to cause inversion and reversion of the neck ring for transferring parisons from the blank forming position to the final blowing position and for returning the neck ring for forming the next succeeding parison.

Associated with the blank mold are suitable forming means including a suitable neck pin and nipple, which are not shown, due to their being hidden by other portions of the device in the views included in the accompanying drawings. Also associated with the blank mold 62 is a funnel support 80 (Figs. 2 and 5) which is adapted to carry a suitable funnel for directing the charges from the deflector 23 downward into the cavity of the mold 62. For applying settle blowing pressure to the glass in the mold 62, a settle blowhead 81 is provided, this settle blowhead also serving in a later operation in the article forming cycle to act as a counterblow baffle, so that when counterblowing pressure is admitted through the neck ring, the head 81 will serve to shape the bottom of a parison being formed in the blank mold. The funnel support 80 and the combined settle blowhead and counterblow baffle 81 are mounted on vertical standards 82 and 83 respectively, which standards may be the piston rods of suitable pneumatic cylinders (not shown) by which these parts may be moved in a vertical direction. Suitable twist cams may be provided on the standards 82 or 83, or on some part associated therewith, in order that the funnel support 80 and the head 81 may be rotated partially about the axes of the shafts 82 and 83 respectively, incident to their vertical movement. Associated with the final blow mold is a final blow head, not shown in Fig. 5, but indicated in Fig. 2 at 84. This head is mounted upon a vertical shaft 85, similar to the shafts 82 and 83, and preferably provided with pneumatic means for moving it vertically and also with a suitable twist cam for giving it a lateral movement incident to its vertical movement.

Suitable wind supplying means illustrated at 86 and 87 may be provided for supplying cooling wind to the blow mold and the blank mold respectively. Wind for distribution to the several forming units, and particularly to the wind nozzles 86 and 87 thereof, is supplied to the main base 10 through an aperture 10a therein (Figs. 4 and 5), and thence passes through registering apertures 10b and 8a to the inside of each of the sub-bases 8 which preferably rest flat on the floor on which the machine is mounted, so that ordinarily no provision need be made for closing the bottom portions of the sub-bases, although a sheet metal plate (not shown) may be used for this purpose if desired. The upper portions of the sub-bases 8 are provided with large apertures 8b (Figs. 3 and 4), each of which is preferably partially closed by a sheet metal plate 8c adapted to be received in a recessed portion 8d at the periphery of the aperture 8b. The bases 7 upon which the forming units are mounted, are provided with apertures 7a which register with portions of apertures 8b for the transmission therethrough of the cooling wind to the interior of a box-like structure 112 forming the support for the various operating elements of the forming unit. From the interior of this structure 112, which in practice is substantially closed, cooling wind may pass through nozzles 86 and 87 to cool the molds as desired, suitable dampers (not shown) preferably being provided for controlling the application of such wind.

Thus it will be seen that the forming unit includes all the necessary molds and forming means associated therewith for shaping charges of glass to the desired form of finished articles, such as bottles of the narrow neck type, and that all of these means may be, and preferably are, operated by pneumatic pressure.

The admission and exhaust of pneumatic pressure at the proper times to the several operating means of each unit are controlled by a bank of valves, the location of certain of which is indicated generally at 88, Fig. 1. These valves may be controlled either to admit pressure to their associated pneumatic mechanism or cut off the positive admission of pressure, and exhaust any pressure remaining therein by suitable buttons positioned adjustably about a timing drum indicated at 89 (see also Fig. 6). The details of construction of this timer mechanism will be found in the Ingle Patent No. 1,843,159, granted Feb. 2, 1932 above referred to. In that patent there is disclosed that a relatively short button on the drum 89 contacts with certain valve operating mechanism and moves the associated valve to a position such that pressure will be admitted through a pressure supply line to an associated mechanism. This pressure will be admitted until a relatively longer button positioned on the drum 89, in the same line as the short button, contacts with the valve operating mechanism and moves the valve back to its initial position in which pressure is cut off to the associated mechanism and exhausted through the valve to the atmosphere. Thus, by suitably locating short and long buttons about the periphery of the drum 89 for each of the plurality of valves controlling the several pneumatically operating mechanisms, it is possible to cause the operating mechanisms to accommodate a very large variety of sizes and shapes of articles and thus to provide a large range in any part of which the machine will operate at maximum efficiency.

The drum 89 is adapted to be rotated once for each complete cycle of the forming unit, that is, for each charge supplied thereto or for each completed article delivered therefrom. The drum 89 of each unit is arranged to be driven by a driving gear 90 which may be suitably clutched thereto by means later to be described, the gear 90 being driven (for units 1, 3, 4 and 6) by a pinion 91 mounted upon a shaft 92 which carries intermediate its ends a bevelled gear 93 meshing with a bevelled pinion 94 (see Figs. 3 and 4), carried by a hollow shaft 95. The hollow shaft 95 telescopically receives a shaft 96 and is suitably splined or otherwise keyed thereto, so that no relative rotation may be had between shafts 95 and 96 although these shafts may telescope freely one within the other. The shaft 96 carries at its inner end a bevelled pinion 97 which is continually in mesh with the bevelled ring gear 69 which rotates continuously with the funnel 38 and sleeve 39 as long as the motor 40 and feeder F remain in operation. Units 2 and 5 are somewhat different in their arrangement from the remaining units in that the timing drums 89 of each of these units are located at one side thereof rather than at the end, this for the purpose of decreasing the width of the machine as a whole. The connections to the various valves operated by the timing drum 89 of the units 2 and 5 are exactly the same as the other units, the sole difference being in the position of the valves and in the drive of their drums 89. In the case of these units, the hollow shaft 95 is provided at its outer end with a suitable sprocket wheel connected by a sprocket chain 98 with a sprocket wheel, which replaces in its position and functions the gear 90. Thus the drive from the shaft 95 to the drum 89 of units 2 and 5 is slightly different from the others, but the ratios of the sprocket wheels are the same as is the gear speed ratio between the shaft 95 and the gear 90 in the arrangement utilized in the case of units 1, 3, 4 and 6.

The telescoping arrangement of the shafts 95 and 96 permits of the outward movement of the individual units from their operative to their inoperative positions, as above set forth. Thus a unit may be moved to its outward or inoperative position and then the timing drum may be put into operation by throwing in the clutch, later to be described, and the operating parts of the unit tested while at such inoperative position.

Each unit is provided with a lever 99 (Figs. 1 and 2) by which the unit as a whole may be thrown into or out of operation. This lever operates a special pneumatic valve which accomplishes two things in throwing the unit out of operation. In the first place, it changes the application of pressure from one side to the other of a clutch operating piston, shown at 100 in Fig. 6, and second when the lever is thrown to render the associated unit inoperative, it automatically exhausts any pressure which may be admitted to the cylinder 35 controlling the operation of the associated charge interceptor or scoop 33, thus allowing this interceptor to be drawn to and maintained at its inoperative position by the springs 36. The details of this valve and its operation are disclosed in the Ingle Patent No. 1,911,119 above referred to.

In Fig. 6 is shown a cross sectional detail of one of the drums 89 showing particularly the pneumatic clutch for throwing the drum into or out of operation and also showing how the timing of the units may be accomplished. The drum 89 is as a whole mounted upon a central shaft 101, but in a way such that the shaft may freely rotate within the drum. Secured to the shaft 101 is a suitable housing member 102 in which is formed a cylinder 103, in which the piston 100 operates. A cylinder head 104 is suitably secured to the member 102. Pressure may be admitted to the opposite ends of the cylinder 103 from the valve (not shown) controlled by the handle 99 through suitable longitudinal passages in the shaft 101, one of which is indicated at 105, these passages communicating through lateral ports with annular grooves formed either in the shaft 101 or in the casing 102 as shown, and those grooves in turn with the opposite ends of the cylinder 103. The piston 100 is secured to a piston rod 106 carrying at its outer end a pin 107 which is adapted to enter into a single aperture in the inside periphery of a ring 108 inside the drum 89. Thus the shaft 101 may be clutched only in a single position to the ring 108 so that when the machine as a whole is set up, the rings 108 for each unit will all be in a predetermined angular relation to each other when their associated clutches are engaged. The ring 108 for each unit is provided on its outer periphery with a plurality of recesses in any one of which a pin 109 extending through a single aperture in the drum 89 may be caused to enter to lock the ring at a desired angular position with respect to the drum 89. Thus, the zero point about the periphery of the drum may be secured in a desired relation to the clutch member and in turn to the zero points of the drums of the other units.

Thus, when one or more units are to be thrown out of operation, the drums 89 of the remaining units must be so readjusted angularly with respect to their rings 108 and the pin 109 locked in the proper recess in the rings so that their zero points will be properly distributed about the circle and so that the units remaining in operation may be timed to receive all the charges from the feeder. Thus, for example, if all 6 units are operating, the zero points of the several drums 89 will be 60° apart. If only 5 units are operating, these zero points will be 72° apart; and if 4 units are operating, the zero points will be 90° apart, etc.

Another adjustment which must be made in retiming the device in order that the feeder may supply a smaller number of forming units than the whole number without loss of some charges of glass to cullet, is a ratio change between the drive for the drums 89 of the units to be operated and the feeder drive. This is preferably accomplished by interchanging one or both the sprocket wheels 43 and 44 (see Fig. 5) for other sprocket wheels having a desired ratio. This will change the ratio of the feeder drive with respect to that of all the operating units simultaneously so that from the point of view of the mechanisms thus far described, but one such ratio change need be made. In the usual practice, each unit is operated at its highest efficient speed so that when a smaller number of units is to be operated, the feeder speed is proportionately reduced and a suitable ratio change is made as above set forth, to cause each unit to operate after the change at its highest efficient speed. This will result in the units remaining in operation receiving and forming to the desired shape all the charges supplied by the feeder F. At the same time, some change may have to be made in the phase changing device 51 by suitable rotation of the crank 55, and of course a change must usually be made in the angular relation between the drums 89 of the units to be continued in operation and their respective rings 108.

One of the differences between the forming units of the present application and the units disclosed in the Ingle Patent No. 1,911,119 and now commercially used in the "Hartford I. S." machine, is in the means for vertically adjusting the bottom plates for the final blow molds which may be used for compensating for molds of different heights. This change was made in the instant case in order to render the adjusting means for these bottom plates more accessible than would be the case were the present commercial means employed. The present construction is best illustrated in Fig. 9 in which is shown a horizontal sectional view of a portion of a unit taken part way down the box-like base structure at the top of which the molds are mounted. As shown in Fig. 9, the unit comprises a box-like structure 112 having a recessed portion 113 at one end substantially under the position of final blow mold 63. In the portion 113 is received a slide 114 which is retained in a desired position by guide portions 115 and 116. The final blow bottom plate is mounted upon a stem 117 suitably connected in or to the slide 114. For adjusting the slide 114 vertically with respect to the base member 112 of the unit, the rear member 118 of the slide 114 is provided with rack teeth meshing with a pinion 119 secured to a transversely extending shaft 120. The shaft 120 is suitably journaled in one side of the base member 112 and in a projection of the recessed portion 113 thereof. At its outer end the shaft 120 carries secured thereto a worm wheel 121 which meshes with a worm 122 secured to a shaft 123, the upper end of which is squared for engagement by a suitable tool. Thus by rotating the shaft 123 by a suitable tool, the slide 114 and the bottom plate carried thereby may be adjusted vertically. It will be seen that the shaft 123 is accessible from one side of the unit, as indicated in Fig. 2.

*Takeout tongs, actuating and adjusting mechanisms therefor*

Associated with each of the forming units is a takeout tongs mechanism for removing completed articles from the final blow mold after the opening thereof and for placing such articles upon a suitable associated dead plate later to be described. These tongs are shown particularly in Fig. 7 and are also illustrated to some extent in Figs. 2 and 5. Certain details of construction and adjustment of the takeout mechanism are further illustrated in Figs. 8 and 9.

The takeout tongs 124 (Fig. 7) are carried by a structure including a cylinder 125, which is slidably received in vertical guideways for adjustment with respect to the unit base 112, as shown in detail in Fig. 9. For this purpose, the cylinder 125 is provided with lateral flange portions 126 which are guided respectively by a portion of the guide 116 and by a guide 127 for vertical adjustive movement of the cylinder 125 with respect to the base 112. The inner face of the cylinder 125 is formed flat for contact with the flat face of the base member 112. There is provided on this flat face suitable rack teeth indicated at 128, with which meshes a pinion 129 secured to a short shaft journaled in a suitable bearing in one side of the base member 112 and having secured thereto at its outer end a worm wheel 130. Cooperating with the worm wheel 130 is a worm 131 secured to a vertical shaft 132 the upper end of which is squared, as illustrated at 133 in Figs. 7 and 9, for the reception of a suitable tool in the same way as in the case of shaft 123 above described. Thus by rotation of the shaft 132 by a suitable tool applied to the squared end 133 thereof, vertical adjustive movement will be imparted to the cylinder 125 with respect to the base 112 and thereby to the takeout tongs for accommodating articles of different heights.

Figure 7:
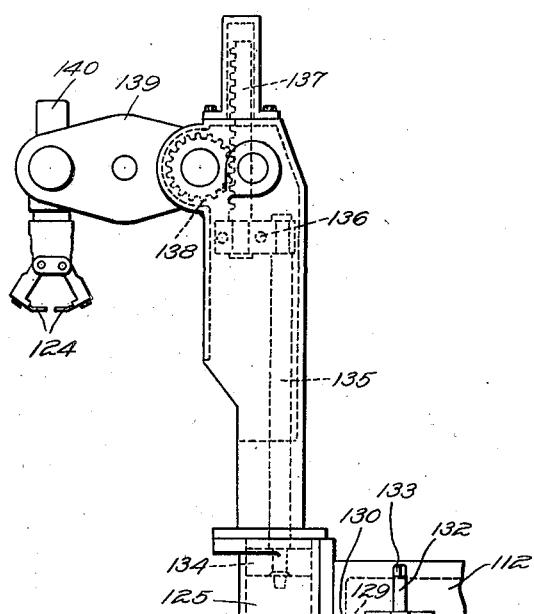
Fig. 7 is a fragmentary view in elevation showing one of the take-out mechanisms and the operating and adjusting means therefor.
Figure 8:
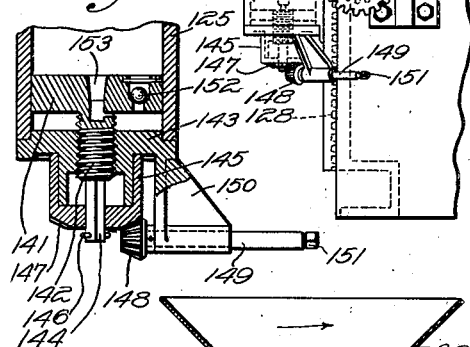
Fig. 8 is a fragmentary vertical sectional view of the bottom of an operating cylinder for one of the take-out mechanisms showing the construction and operation of one of the adjustments therefor.

As illustrated in dotted lines in Fig. 7, the cylinder 125 is provided with a piston 134 to which is connected a piston rod 135 having at its upper end an offset but rigid connection 136 with a vertical rack 137 which meshes with a pinion 138 by which the arm 139 carrying a tongs is rotated about the axis of the shaft upon which this pinion is mounted. Thus the tongs may be moved back and forth through an angle of substantially 180° by the admission and exhaust of pressure to the upper and lower ends of the cylinder 125. Such admission and exhaust of pressure is controlled by the timing drum 89. Suitable means of the parallel motion type, and preferably comprising three meshing pinions, are included within the arm 139 in a manner not here specifically illustrated for maintaining the tongs carrying member 140 with its axis always vertical irrespective of the rotation of the arm 139 as above described. Means for opening and closing the tongs 124 are included within the member 140 and may comprise a suitable pneumatic cylinder for moving the tongs from closed to open position and a suitable springs for closing the tongs when the pressure to such cylinder is exhausted. The details of the parallel motion means and the tongs operating means are not here specifically illustrated as they form, per se, no part of the present invention.

Means are provided in connection with the lower end of the cylinder 125 for adjustably stopping the downward movement of the piston 134 in this cylinder and thus for adjustably determining the limit of movement of the tongs toward the final blow mold of the associated unit. Such means in the present instance include a vertically adjustable bottom 141 (Figs. 7 and 8) for this cylinder which may be adjusted to determine the lower limit of the piston movement therein. For adjusting the bottom 141 vertically with respect to the cylinder 125, it is provided with a stem 142 threaded into the lower cylinder head 143. The lower end of the stem 142 is squared as illustrated at 144 and passes loosely through a square hole in a cap member 145 sleeved loosely about a circular projection on the lower end of the cylinder head 143. The squared end 144 of the stem 142 is provided with a transverse pin 146 to prevent excessive movement of the bottom 141 with respect to the cap 145. The cap 145 is provided with an annular series of beveled gear teeth 147 meshing with a beveled pinion 148 secured to a transverse shaft 149 which is journaled in a suitable bearing in a bracket extension 150 of the cylinder head 143. The shaft 149 is provided with a squared end 151 for the reception of a suitable tool by which the shaft 149 and cap 145 may be rotated. Rotation imparted to the cap 145 will be transmitted to the stem 142 to rotate this stem and thus screw it up or down with respect to the cylinder head 143, thus raising or lowering the bottom 141 with respect to the cylinder 125. Pressure admission and exhaust means are formed in the bottom 141, including a ball check valve 152, through which pressure may pass freely into the lower end of the cylinder, but which prevents flow of pressure in the opposite direction. The head 141 is further provided with a tapered aperture 153 which is adapted to cooperate with a correspondingly shaped pin on the lower end of the piston 134 for providing a cushion stop for the downward piston movement, as set forth specifically in the Ingle Patent No. 1,911,119, above referred to.

Thus, by the combined adjustment of the cylinder 125 vertically with respect to the base 112 and the minor vertical adjustment of the bottom 141 of the cylinder, the tongs 124 may be caused to operate in a desired arc to accommodate the takeout to bottles of varying heights. Both these adjustments for the takeout are accessible from the side of the forming unit, particularly when the unit is moved to its outward position, which is a slightly different arrangement from the corresponding parts described in the Ingle Patent No. 1,911,119.

Air pressure for moving the piston 134 in its cylinder 125 for opening the tongs when such action is desired, is supplied through suitable pressure ducts from the timing valves controlled by the drum 89 of the corresponding unit, so that the takeout mechanism may be properly timed with respect to the other mechanisms of the unit with which it is associated.

*Conveyor, mounting, operating and adjusting means for different numbers of units in operation*

Associated with the plural unit machine above described is a conveyor for transporting finished articles from the region of the machine and preferably from a region substantially centrally of the several forming units thereof to a desired delivery point at which, for example, a stacker (not shown) may be situated for stacking articles transported by the conveyor onto the belt of a glassware annealing lehr (not shown). The conveyor is indicated in the accompanying drawings by the reference character C and is preferably continuously driven by suitable mechanism timed and synchronized with the operation of the feeder F and the several units of the forming machine.

The conveyor, as a whole, is supported by a base structure made up of a pair of longitudinally extending channel irons 154 (see Figs. 11, 12 and 13). These channel irons are secured together by an upper plate 155 and a lower plate 156, so that the whole forms a duct or passage for a purpose hereinafter to be described. The structure, including channel irons 154 and upper and lower plates 155 and 156, is supported intermediate its ends upon a cross channel 157 (Figs. 10 and 11) which is mounted upon the upper ends of jack screws 158 threaded through suitable brackets 159 which are secured to the lateral sides of the standard 18. The jack screws 158 are preferably locked in adjusted position by the lock nuts 160 adapted to be tightened against the lower surfaces of the brackets 159. Any suitable vertically adjustable support may be employed for the other end of the conveyor, by which this end may similarly be adjusted vertically and by which the level of the conveyor may also be adjusted as desired. This latter support is not shown in the accompanying drawings, but it is to be understood that it may be of any desired type suitable for the purpose.

Suitable rolls are provided at each end of the supported structure for the conveyor, the one at the inner end being shown at 161, Fig. 11, and that at the outer end being indicated in dotted lines at 162 in Figs. 1 and 2. Driving power for operating the conveyor is preferably transmitted thereto through the roll 162, which is secured to a transverse shaft 163 carrying at its outer end a sprocket wheel about which a sprocket chain 164 passes. At the opposite end of its course, the sprocket chain 164 passes about a sprocket wheel secured to a transverse shaft 165 (Fig. 10), which is journaled in suitable bearings 166 and 167 secured to the channel members 154 which support the conveyor, and which carries at its end opposite that to which the sprocket wheel is attached, a beveled pinion 168. Meshing with the pinion 168 is a beveled pinion 169 secured to the upper end of a vertical shaft 170 journaled in a bracket 171 secured to one of the channel members 154 and also having a portion forming the bearing 167. At its lower end, the shaft 170 has secured thereto a sprocket wheel 172 about which passes a sprocket chain 173 passing also about a sprocket wheel 174 secured to the vertical shaft 52, which, as above explained, is driven directly from the motor 40 which operates the feeder. Thus as long as the motor 40 remains in operation to operate the feeder F, the conveyor C will be driven continuously through the mechanical train above described.

From the point of view of synchronizing the operation of the conveyor with that of the feeder and also of the various forming units, it will be seen that the conveyor will be moved a certain predetermined distance for every charge supplied by the feeder, and that this distance will be unchanged by different settings of the crank 55 of the phase changing device 51, although during such change of setting of the crank 55, and as a result thereof, the particular point at which an article will be placed upon the conveyor will be changed with respect to the feeder, but that once the crank 55 remains stationary the articles will have the same spacings between centers as before the adjustment. Furthermore, it will be noted that even though a smaller number of units than the total number are in operation, the conveyor would normally be moved the same predetermined distance for each charge fed by the feeder were it not for the fact that the ratio of speed between the shafts 42 and 46 (Fig. 5) has been changed by interchanging the sprocket wheels about which sprocket chain 45 passes. In order, therefore, to insure that the spacing of articles on the conveyor will be the same for various numbers of forming units in operation, a corresponding change may be made, preferably in the sprocket wheels about which sprocket chain 164 passes, to offset the change made in the sprocket wheels about which chain 45 passes. For this reason the sprocket wheels about which chain 164 passes are made removable and interchangeable, so as to reestablish the initial relation of speed between the feeder and conveyor, so that the conveyor will always move a certain predetermined distance for each charge fed irrespective of the number of forming units that are in operation. Thus when a different number of forming units is to be employed, it is necessary to change the ratios of the sprocket wheels about which sprocket chain 45 passes and make a corresponding change in the other direction in the sprocket wheels about which chain 164 passes.

*Dead plates and ware cooling means*

In order to provide for the cooling of articles removed from the final blow molds of the several units in a somewhat semi-plastic condition and thereby to prevent such articles being deformed due to their relatively high plasticity, it is desired that the articles be first placed upon suitable dead plates through which cooling wind may be passed for abstracting heat therefrom, particularly from the bottom portions of the articles which are usually the hottest at the time the articles are removed from the molds.

For this purpose, a plurality of dead plates equal in number to the units, i. e., six, are provided, as generally indicated at 175, Figs. 2, 5, 10, 11 and 12. These dead plates are preferably formed as hollow castings suitably secured to the conveyor supporting channels 154, as by bolts 176 (Figs. 10 and 11). The tops of these castings are formed with recessed openings in which are inset suitable plates 177 (Fig. 12) having perforations 178 therein through which cooling wind may pass to cool articles placed thereon.

Cooling wind may be admitted to the inside of the passage formed by channels 154 and top and bottom plates 155 and 156 through a lateral port 179 (Figs. 5, 10 and 11) from any suitable source, the wind passing along the passage space within the conveyor supports and thence through aligned ports 180 (Fig. 12) in the channels 154 and sides of the hollow members or castings 175 to the interior thereof, and thence upwardly through the perforations 178 onto the articles to be cooled. Suitable dampers (not shown) may be employed, if desired, for controlling the amount of wind passing through each of the dead plates, although the use of such dampers is not necessarily required as the articles normally rest upon each of the dead plates the same length of time, so that the control by a single damper, or other suitable control of the amount of wind admitted through the port 179 to the conveyor supporting casing will usually be sufficient.

The takeouts described in a preceding section are adapted to remove finished articles from the final blow molds of the several units respectively, and place them centrally of the dead plates 175 just described.

*Push-offs from dead plates to conveyor-construction, mounting, operation and synchronization*

Associated with each of the dead plates 175 for moving articles therefrom onto the conveyor C is a push-off means including a pair of fingers 181 mounted horizontally in a suitable supporting post 182. Each post 182 is mounted in an arm 183 for adjustment about the axis of the post, so as to adjust the position of the fingers 181 and the angle at which they contact with the articles in moving them from the dead plates onto the conveyor. The arms 183 are mounted for free pivotal movement on vertical pintles 184, two of which on each side of the conveyor are supported by two of the dead plate castings 175, and the other of which is supported upon a suitable bracket 185.

Also mounted on the pintles 184 are arms 186 having extensions 187 adapted to engage with the arms 183, as seen best in Fig. 10, to move the arms 183 in one direction in response to movement of the arms 186. Arms 183 and 186 are respectively connected together by tension springs 188, so that these arms are normally maintained in a predetermined angular relation each to the other. However, should the fingers 181 of one of the arms come in contact with some obstruction which will not easily move, so that breakage might result should not a yielding connection be provided, the springs 188 will yield, permitting relative motion between the fingers 181 and the associated arms 186. The arms 186 are connected by links 189 with one arm respectively of bell crank levers 190 journaled for independent movement upon pintles 191, there being three of these levers on each side of the conveyor C for operating the three push-offs on the respective sides. The other arms of the bell crank levers 190 are formed as cam followers and are located in the paths of rotary cams 192 mounted upon shafts 193 and 194 respectively. Tension springs 195 connect each of the bell crank levers 190 with suitable anchorages 196 and thus keep the cam followers in contact with the cams and serve to retract the push-off fingers 181 after an article has been moved onto the conveyor. Thus the cams 192 are effective positively to move the bell cranks 190, the links 189, and the levers 186, and in the event that the fingers 181 strike some obstruction, the springs 188 will yield, permitting this movement without injury to any of the parts. Stop screws 190ª may be provided as indicated and may be adjustably positioned to predetermine the outward positions of the respective push-off fingers as desired.

The cams 192 on either side of the conveyor C are preferably formed as a single unit in a group of three, and are interchangeable so as to compensate for different numbers of forming units in operation. These cams are formed upon sleeves 197 (Fig. 14) each of which is provided with a cross pin 198 secured therein and adapted to be received in a slot 198' in the upper ends of the shaft 193 or 194. These shafts 193 and 194 have pinned thereto, adjacent to their upper ends, collars 199 resting upon the top of bearing sleeves 200 which are suitably secured to a bracket 201, as by pins 202 (Figs. 13 and 15). The bracket 201 is suitably secured to the conveyor frame channels 154 as by bolts 203 (Fig. 13). Thus the sleeves 197 and cams 192 formed thereon on each side of the conveyor may be easily removed as a whole, and differently shaped cams substituted therefor when it is desired to utilize a different number of forming units or different forming units.

The shafts 193 and 194 have secured thereto, at their lower ends, bracket extensions 204 (Figs. 15 and 16). In these bracket extensions are journaled transverse shafts 205 carrying the worms 206 meshing with worm wheels 207, which are mounted for free rotation with respect to the shafts 193 and 194. Thus by turning the handles 208 on the ends of the shafts 205, the worms 206 may be rotated to change the angular relation between the shaft 193 or 194 and their associated worm wheels 207. The worm wheels 207 are keyed rigidly to reduced extensions 209, preferably integral with large gear wheels 210. Gear wheels 210 mesh with one another, as indicated in Fig. 10, and one of these gear wheels also meshes with a pinion 211 secured to the shaft 170 by which power is transmitted from the motor 40 which operates the feeder to drive the conveyor C, as above set forth.

The bracket 201 also supports the vertical pintles 191 upon which the bell cranks 190 are mounted. In Fig. 11 it will be seen that these pintles 191 are formed with three successively smaller diameters, so that the weight of each of the bell cranks is sustained by the shoulder intermediate the several diameters of these shafts rather than upon each other.

The parts are shown in Figs. 10 and 11 in an arrangement in which all six forming units are in operation. Under these circumstances the motor 40 will operate the feeder F and motion will be transmitted through the mechanical train above set forth to operate the push-off fingers 181 in proper synchronized timed relation to the operation of the several units. Should it be desired to change the time the articles are allowed to remain upon the dead plates, this may be accomplished by changing the phase relation between the angular position of shafts 193 and 194 and their driving means (the gears 210), that is, by rotating the shafts 205 by turning the handles 208 at the bottom of each of the shafts 193 and 194. Under ordinary circumstances, the time in which articles are allowed to remain upon the dead plates 175 is preferably the same for articles delivered to each side of the conveyor, so that a simultaneous adjustment by the same amount will be made in the setting of the handles 208 which rotate the shafts 205.

If now it is desired to operate a lesser number of units than the total, it is necessary that the cam shafts 193 and 194 rotate at a slower rate with respect to the feeder, that is, rotate one revolution for a number of charges corresponding to the number of units remaining in operation. Under these circumstances, the interchanging of the sprocket wheels 43 and 44, about which sprocket chain 45 passes, will serve to effect this timing relation change. If then the appropriate cams are placed upon the shafts 193 and 194, instead of those shown on these shafts, the pushing fingers may be operated in proper synchronized timed relation. Thus the only additional change to those above set forth required in order properly to time the operation of the pusher fingers with the operations of the feeder and forming units for a smaller number of units in operation than the total number is to interchange the sets of cams 192 carried by sleeves 197 on each side of the conveyor C.

*General arrangements and adjustments for the entire machine and associated mechanisms*

From the above description it will be apparent that we have provided a machine including six similar autonomous glass forming units all adapted to receive charges from a single feeder and all grouped about a common point in vertical alignment with the orifice of that feeder through which the glass passes to be separated into charges for distribution to all the units.

The general arrangement of the sections is such that they are substantially radially arranged about a point in vertical alignment with the feeder orifice, so that planes containing the axes of the blank and blow molds of each unit respectively will pass through and intersect in a vertical line through the feeder orifice. In this way the horizontal component of the path of a charge of glass down the chute system to any unit will also lie in the plane including the vertical axes of the blank and blow molds of that unit, so that in the event that the blank molds are of irregular shape, for example, such as to form parisons for the production of panel bottles or other irregular ware, the charges will be received in the blank molds of all units in exactly the same way.

Furthermore, it will be seen from a consideration of the above description that the blank molds of each of the several units are spaced further from the center about which the several forming units are grouped in a horizontal direction than are their corresponding blow molds. This results in the possibility of removing articles from the final blow molds of each of the units toward a region centrally of the several units, so that in practice the articles may be removed from the final blow molds in a direction generally toward the center and may be there placed upon a single conveyor in the manner illustrated and described. This simplifies greatly the handling of the ware from a plural unit machine in which the units each occupy a fixed predetermined position, especially as opposed to prior machines in which the removal of completed articles is necessarily to the outside, so that in the event that the several units occupy fixed positions as a whole, the problem of ware handling for the completed articles becomes extremely difficult, and the devices used therefor cumbersome.

It will also be seen that we have provided a machine and ware handling mechanisms associated therewith of an extremely flexible nature, so that any number of units up to the whole number may be operated in proper time relation each to the others, and in proper synchronized time relation with the feeder and with article-handling means, and so that no charges of glass supplied by the feeder need be lost when a smaller number of forming units is in operation than the total number provided. This makes for the utmost flexibility in the planning and scheduling of manufacturing operations to the end that a uniform draw upon the associated tank in which the glass is produced is made possible.

While it is contemplated that any of the several units may be withdrawn for purpose of changing molds, as for instance, for starting the manufacture of a different type of article, or for repair or adjustment of any parts, one of the chief functions of this machine is its ability to operate, as above set forth, with a smaller number of forming units than the total number. If one or more units are to be put out of operation for the sole purpose of operating a fewer number of units, it may be found desirable to operate certain only of the units and in a predetermined sequence. For example, if all six units are to be in operation, the sequence of supplying charges thereto may be 4, 1, 5, 3, 6, 2; when five sections are to be operated the sequence may be 3, 6, 4, 1, 5; when four units are to be operated, the sequence may be 3, 6, 4, 1; when three units are to be operated, the sequence may be 3, 1, 5; and when two units are to be operated, the sequence may be 2, 5.

The sequences of supplying charges to the several units here given are such that if the conveyor is moved a distance equal to the distance between centers of adjacent dead plates on one side of the conveyor in the interval of time between the supplying of successive charges, the articles will be spaced on the conveyor in equally spaced relation, and the distance between the centers of adjacent articles will be equal to the distance between centers of adjacent dead plates.

In each of the above given schedules for sequential operation of the forming units, it is to be noted that relatively opposite units are supplied with charges of glass in sequence. The primary purpose of this order of operation is to provide for the most rapid operation of the several units which is possible. Thus by supplying in sequence units spaced apart by at least one intermediate unit, the relative angle at which the sequentially operated charge interceptor scoops are projected into charge intercepting position is substantially such that one scoop need not be wholly withdrawn from its charge intercepting position before the scoop of the next succeeding unit to be supplied with a charge is started in its movement toward its charge intercepting position. Should adjacent units be operated sequentially, it would be necessary to wait until the charge interceptor scoop of one unit was substantially completely withdrawn before the scoop of the adjacent unit could be started forward toward its charge intercepting position, which would entail a time lag, which in the course of 24 hours would result in a lower production for the machine as a whole. Thus any desired sequential operation may be employed, but preferably some such sequence as that given should be used in order that units which are to be supplied with successively fed charges of glass will be spaced apart by at least one intermediate unit.

While it is desirable, as above set forth, that adjacent units be not supplied with charges in sequence, especially where all the units are in operation, this sequential supplying of charges becomes of less importance where one or more of the units are thrown out of operation, as for example, in the event that it is desired to use three, four or five of the units in equally spaced relation, as above set forth, leaving the remainder out of operation. Under these circumstances, it is sometimes more important to be able to use any desired units up to the number desired to be operated with a free selection of the particular units to be used. Our device is adaptable to this manner of operation, and provides for the free selection of any number of units from one to six, and any desired units with the accompanying ability to place the articles on the conveyor in equally spaced relation, although this spacing is not always the full distance between adjacent dead plates or any one predetermined fraction thereof. We have, however, discovered the novel relationship that if "$n$" is the number of units to be operated, a free selection of the particular units may be had and the articles may be placed upon the conveyor in evenly spaced relation and with a distance apart equal to $$\frac{1}{n}$$

times the distance between adjacent dead plates on one side of the conveyor.

Thus, for example, with six units in operation, the sequence will be 4—1—5—3—6—2. It will be noted that this sequence provides for the successive supplying of relatively opposite units with charges of glass. Some of the other sequences using a smaller number of units do not adhere to this rule.

With five units in operation and with unit 1 out, the sequence is 4—2—6—3—5; with unit 2 out, 3—6—4—1—5; with unit 3 out, 4—2—6—1—5; with unit 4 out, 3—5—1—6—2; with unit 5 out, 4—1—3—2—6; and with unit 6 out, 3—5—1—4—2.

The sequences of supplying of charges to the several units using only 4 of those units is as follows: with units 1 and 2 out, 3—5—4—6; with units 1 and 3 out, 4—2—5—6; with units 1 and 4 out, 3—6—2—5; with units 1 and 5 out, 3—4—2—6; with units 1 and 6 out, 4—5—3—2; with units 2 and 3 out, 4—5—6—1; with units 2 and 4 out, 3—5—1—6; with units 2 and 5 out, 3—6—4—1; with units 2 and 6 out, 4—3—5—1; with units 3 and 4 out, 5—6—2—1; with units 3 and 5 out, 4—2—6—1; with units 3 and 6 out, 4—1—5—2; with units 4 and 5 out, 3—2—1—6; with units 4 and 6 out, 3—5—2—1; and with units 5 and 6 out, 4—2—3—1.

In the same way the sequential operation of supplying of charges to the several units with three of these units in operation is as follows: with units 1, 2 and 3 out, 4—5—6; with units 1, 2 and 4 out, 3—5—6; with units 1, 2 and 5 out, 3—6—4; with units 1, 2 and 6 out, 5—3—4; with units 1, 3 and 4 out, 6—2—5; with units 1, 3 and 5 out, 6—2—4; with units 1, 3 and 6 out, 5—2—4; with units 1, 4 and 5 out, 6—2—3; with units 1, 5 and 6 out, 2—4—3; with units 2, 3 and 4 out, 6—1—5; with units 2, 3 and 5 out, 4—1—6; with units 2, 3 and 6 out, 1—5—4; with units 2, 4 and 5 out, 3—6—1; with units 2, 4 and 6 out, 3—5—1; with units 2, 5 and 6 out, 3—4—1; with units 3, 4 and 5 out, 2—6—1; with units 3, 5 and 6 out, 4—2—1; and with units 4, 5 and 6 out, 3—2—1.

In the same way the sequences of operation when using but 2 of the available units is as follows:

When using units 1 and 2 — 1—2;
When using units 1 and 3 — 1—3;
When using units 1 and 4 — 1—4;
When using units 1 and 5 — 1—5;
When using units 1 and 6 — 1—6;
When using units 2 and 3 — 2—3;
When using units 2 and 4 — 2—4;
When using units 2 and 5 — 2—5;
When using units 2 and 6 — 2—6;
When using units 3 and 4 — 3—4;
When using units 3 and 5 — 3—5;
When using units 3 and 6 — 3—6;
When using units 4 and 5 — 4—5;
When using units 4 and 6 — 4—6;
When using units 5 and 6 — 5—6.

Thus, according to this manner of operation, if 6 units are in operation, the articles will be spaced apart one-sixth of the distance between adjacent dead plates on one side of the conveyor; if 5 units are to be operated, the spacing will be one-fifth of the distance between dead plates; if 4 units, one-fourth; if 3 units, one-third; if 2 units, one-half; and if 1 unit is to be operated, the distance between articles is equal to the spacing between adjacent dead plates. Thus, by this manner of operation, there is provided an arrangement by which equal spacing may be had between articles on the conveyor irrespective of how many units are to be operated, and irrespective of which unit, or units, it is desired to operate or leave out of operation. The above given series of sequences covers all the possible arrangements, using all possible numbers of units and in all possible combinations.

It is contemplated that changes may be made in the particular details of construction of some or all of the various parts without departure from the spirit of this invention, and that individual instrumentalities or combinations and sub-combinations thereof may have independent usefulness without the necessity of using each and every one of the instrumentalities provided according to the foregoing description. We do not wish to be limited, therefore, except by the scope of the appended claims, which are to be construed as broadly as the state of the prior art permits.

We claim:

1. Apparatus for forming articles of glassware, comprising a plurality of autonomous glass forming units, each adapted as a whole to occupy a fixed predetermined position when in operation and all being grouped about a point in vertical alignment with which glass charges to be supplied for distribution to all said units are separated from a source of molten glass, a common drive for all said units for operating them in synchronism, means associated with certain at least of said units for moving such units from their respective predetermined operative positions to inoperative positions at which access may be had to the units for replacement or repair of the parts thereof, or for effecting desired adjustments, and means imparting motion from said common drive to each of said units in a manner such as to be uninterrupted by movement of any one or more units from its operative to its inoperative position.

2. Apparatus for forming articles of glassware, comprising a plurality of autonomous glass forming units, each adapted as a whole to occupy a fixed predetermined position when in operation and all being disposed in a substantially radial arrangement about a common center in vertical alignment with which glass charges to be supplied for distribution to all said units are separated from a source of molten glass, and pneumatic piston-cylinder means associated with each of said units for moving the units in a substantially radial direction between their operative positions and inoperative positions at which access may be had to the several units for replacement or repairs of the parts thereof, or for effecting desired adjustment.

3. Apparatus for forming articles of glassware, comprising a plurality of similar glass forming units, each adapted as a whole to occupy a fixed predetermined position and all being grouped about a point in vertical alignment with which glass charges for distribution to all said units are separated from a source of molten glass, each unit including a blank mold, a final blow mold positioned laterally out of alignment with said blank mold, means for forming masses of glass to desired shape in each of said molds, and means for transferring partially formed glass articles or parisons from said blank mold to said blow mold; said units being so positioned with respect to said point that the blank molds thereof are positioned further from said point in a horizontal direction than their respective associated blow molds, and means for distributing charges of said glass from said source to each of said blank molds, whereby the completed articles may be removed from the blow molds of all of said units by movement toward a region substantially centrally thereof.

4. Apparatus for forming articles of glassware, comprising a plurality of similar glass forming units, each adapted as a whole to occupy a fixed predetermined position and all being grouped in a substantially radial arrangement about a point in vertical alignment with which glass charges for distribution to all said units are separated from a source of molten glass, each unit including a blank mold, a final blow mold disposed laterally of said blank mold, means for forming parisons in said blank mold, means for blowing said parisons to final form in said blow mold, and means for transferring parisons formed in said blank mold to said blow mold; said unit being so positioned with respect to said point that a vertical plane including the axes of the blank and blow mold of each unit will pass substantially through said point and so that the blank mold of each unit is positioned further from said point than its associated blow mold, and a chute system associated with each of said units for effecting distribution of charges of glass from said source to the blank mold of that unit, the horizontal component of the movement of charges through each chute system lying substantially in the plane including the axes of the blank and blow molds of the associated unit, whereby the completed articles may be removed from said blow molds by a substantially radial movement toward a region substantially central of said units.

5. Apparatus for forming articles of glassware, comprising a plurality of similar glass forming units, each adapted as a whole to occupy a fixed predetermined position and all being grouped about a point in vertical alignment with which glass charges for distribution to all said units are separated from a source of molten glass, each unit including a blank mold, a final blow mold positioned laterally out of alignment with said blank mold, means for forming masses of glass to desired shape in each of said molds, and means for transferring partially formed glass articles or parisons from said blank mold to said blow mold; said units being so positioned with respect to said point that the blank molds thereof are positioned further from said point in a horizontal direction than their respectively associated blow molds, means for distributing charges of glass from said source to each of said blank molds, an endless conveyor disposed with one end of its ware-bearing path outside the confines of the grouped forming units and said path extending at least into the region centrally of the grouped forming units, means for driving said endless conveyor, and automatic means for removing completed glass articles from the final blow molds of each of said units and placing such articles on said conveyor.

6. Apparatus for forming articles of glassware, comprising a plurality of similar glass forming units, each adapted as a whole to occupy a fixed predetermined position and all being grouped about a point in vertical alignment with which glass charges for distribution to all said units are separated from a source of molten glass, said units being so arranged and disposed that access may be had thereto for the removal of finished articles therefrom from the region about which said units are grouped, an endless conveyor disposed with one end of its ware-bearing path outside the confines of the grouped forming units and said path extending at least into said region centrally of the grouped forming units, means for driving said endless conveyor, and automatic means for transferring completed articles of glassware from the several units onto said conveyor.

7. Apparatus for forming articles of glassware, comprising a plurality of similar glass forming units, each adapted as a whole to occupy a fixed predetermined position and all being grouped in a substantially radial arrangement about a point in vertical alignment with which glass charges for distribution to all said units are separated from a source of molten glass, each unit including a blank mold, a final blow mold positioned laterally out of alignment with said blank mold, means for forming masses of glass to desired shapes in each of said molds, and means for transferring partially formed glass articles or parisons from said blank mold to said blow mold; said units being so positioned with respect to said point that the blank molds thereof are positioned further from said point in a horizontal direction than their respectively associated blow molds, an endless conveyor disposed with one end of its ware-bearing path outside the confines of the grouped forming units and the other end in the region centrally thereof adjacent to the point about which said units are grouped, a dead plate in said region contiguous to the path of said conveyor for each unit respectively, takeout means for removing completed articles from the final blow molds of each unit and placing such articles on their respective dead plates, and means for moving the articles from said dead plates onto said conveyor.

8. Apparatus for forming articles of glassware, comprising a plurality of similar glass forming units, each adapted as a whole to occupy a fixed predetermined position and all being grouped about a point in vertical alignment with which glass charges for distribution to all said units are separated from a source of molten glass, said units being so arranged and disposed that access may be had thereto for the removal of finished articles therefrom from the region about which said units are grouped, an endless conveyor disposed with one end of its ware-bearing path outside the confines of the grouped forming units and the other end adjacent to the point about which the units are grouped, means for driving said conveyor, a plurality of perforated dead plates contiguous to the ware-bearing path of said conveyor and in the region about which said units are grouped for receiving finished articles from said units respectively, means to supply cooling air through the perforations of said dead plates for cooling articles thereon, tongs mechanism associated with each of said units for transferring completed articles therefrom to the respective dead plates, and means for moving cooled articles from the dead plates onto said conveyor.

9. Apparatus for forming articles of glassware, comprising a plurality of similar autonomous glass forming units, each adapted as a whole to occupy a fixed predetermined position and all being grouped about a region centrally of the units so as to be supplied with glass charges separated at a single place from a source of molten glass, means to disconnect at will one or more of the glass forming units, a glass feeding mechanism for separating charges of molten glass from said source for distribution to all said units, each of said units including mechanisms for forming charges of glass supplied thereto by said feeding mechanism into articles of the desired form, an endless conveyor for moving completed articles from said region to a desired delivery point, means for transferring completed articles of glassware from each of said units onto said conveyor, means for synchronizing the operation of said feeding mechanism, the operating mechanisms of each of said units, said conveyor, and said transferring means when all said units are in operation to the end that the completed articles will be uniformly spaced apart on said conveyor and for effecting similar synchronization of all the operating mechanisms without loss of any glass charges delivered by said feeding mechanism to cullet when a lesser number of said units are in operation to the end that the same spacing will exist between articles on said conveyor as in the case in which all of said units are in operation.

10. Apparatus for forming articles of glassware, comprising a plurality of similar autonomous glass forming units, each adapted as a whole to occupy a fixed predetermined position and all being grouped so as to be supplied with glass charges separated at a single place from a source of molten glass, means to disconnect at will one or more of the glass forming units, a glass feeding mechanism for separating charges of molten glass from said source for distribution to all said units, each of said units including mechanisms for forming charges of glass, supplied thereto by said feeding mechanism, into articles of the desired form, an endless conveyor for transporting completed articles from all said units to a desired delivery point, means for driving said conveyor, a plurality of dead plates contiguous to the ware-bearing path of said conveyor and located on both sides thereof, one for each of said units respectively, means for transferring completed articles of glassware from each of said units onto its respective dead plate, means for moving the articles from said dead plates onto said conveyor, means for synchronizing the operation of said feeding mechanism, the mechanisms of each of said units, the driving means for said conveyor, the transferring means for transferring completed articles from each of said units onto said dead plates, and the means for moving the completed articles from said dead plates onto said conveyor when all said units are in operation to the end that completed articles will be uniformly spaced apart on said conveyor and for effecting synchronization without loss of any glass charges delivered by said feeding mechanism to cullet when a lesser number of said units are in operation to the end that equal spacing will exist between articles on said conveyor.

11. Apparatus for forming articles of glassware, comprising a plurality of similar autonomous glass forming units, each adapted as a whole to occupy a fixed predetermined position and all being so located as to be supplied with glass charges separated at a single place from a source of molten glass, means to disconnect at will one or more of the glass forming units, a glass feeding mechanism for separating charges of molten glass from said source for distribution to all said units, each of said units including mechanisms for forming charges of glass supplied thereto by said feeding mechanism into articles of the desired form, an endless conveyor for transporting completed articles from all of said units to a desired delivery point, means for driving said conveyor, a plurality of dead plates disposed contiguous to the ware-bearing path of said conveyor, one for each of said units respectively, means for transferring completed articles of glassware from each of said units onto its respective dead plate, means for moving articles from the dead plates onto said conveyor, means for synchronizing the operation of said feeder, the mechanisms of said units, the driving means for said conveyor, the transferring means for transferring completed articles from each of said units onto said dead plates, and the means for moving articles from the dead plates onto said conveyor when all of the units are in operation to the end that completed articles will be uniformly spaced apart on said conveyor and for effecting synchronization of all the operating mechanisms without loss of any glass charges delivered by said feeding mechanism to cullet when any selected units which in number are less than the total number thereof are in operation to the end that uniform spacing will exist between articles on said conveyor.

12. Apparatus for forming articles of glassware, comprising a plurality of similar autonomous glass forming units, each adapted as a whole to occupy a fixed predetermined position and all being grouped about a region centrally of the units so as to be supplied with glass charges separated at a single place from a source of molten glass, means to disconnect at will one or more of the glass forming units, a glass feeding mechanism for separating charges of molten glass from said source for distribution to all said units, each of said units including mechanisms for forming charges of glass supplied thereto by said feeding mechanism into articles of the desired form, and endless conveyor for moving completed articles from said region to a desired delivery point, means for transferring completed articles of glassware from each of said units onto said conveyor, means for synchronizing the operation of said feeder, the operating mechanisms of each of said units, said conveyor, and said transferring means when all of said units are in operation to the end that completed articles will be uniformly spaced apart on said conveyor and for effecting synchronization of all of the above-named operating mechanisms without loss of any glass charges delivered by said feeding mechanism to cullet, when any selected units which in number are less than the total number are in operation to the end that uniform spacing will exist between articles on said conveyor.

13. Apparatus for forming articles of glassware, comprising a plurality of similar autonomous glass forming units, each adapted as a whole to occupy a fixed predetermined position and all being grouped about a common point so as to be supplied with glass charges separated at a single place and from a source of molten glass, means to disconnect at will one or more of the glass forming units, a glass feeding mechanism for separating charges of molten glass from said source for distribution to all said units, each of said units including mechanisms for forming charges of glass supplied thereto by said feeding mechanism into articles of the desired form, an endless conveyor for moving completed articles from all of said units to a desired delivery point, means for driving said conveyor, a plurality of dead plates, one for each unit respectively, contiguous to the ware bearing path of said conveyor and located some on both sides thereof, means for transferring completed articles of glassware from each of said units onto its respective dead plate, means for moving the articles from said dead plates onto said conveyor, means for synchronizing the operation of said feeding mechanism, the mechanisms of each of said units, the driving means for said conveyor, the transferring means for transferring completed articles from each of said units onto said dead plates, and means for moving the completed articles from said dead plates onto said conveyor when all of said units are in operation to the end that the completed articles will be uniformly spaced apart on said conveyor and for effecting synchronization of the various operating mechanisms without loss of any glass charges delivered by said feeding mechanism to cullet when any selected one or more of said units less than the total number are in operation to the end that uniform spacing will exist between articles on said conveyor.

14. Apparatus for forming articles of glassware, comprising a plurality of similar antonomous glass forming units, each adapted as a whole to occupy a fixed predetermined position and all being grouped about a region substantially centrally of said units so as to be supplied with glass charges separated at a single place from a source of molten glass, means to disconnect at will one or more of the glass forming units, a glass feeding mechanism for separating charges of molten glass from said source for distribution to all said units, each of said units including mechanisms for forming charges of glass supplied thereto by said feeding mechanism into articles of the desired form, an endless conveyor extending at least into said region for moving completed articles from all said units to a desired delivery point, means for driving said conveyor, a plurality of dead plates, one for each of said units, contiguous to the ware-bearing path of said conveyor and located some on each side of said path at uniformly spaced intervals apart in a direction parallel to the direction of movement of said conveyor, means for transferring completed articles of glassware from each of said units onto its respective dead plate, means for moving the articles from said dead plates onto said conveyor, and means for synchronizing the operation of said feeding mechanism, the operating mechanisms of each of said units, the driving means for said conveyor, the transferring means for transferring completed articles from units in operation onto their respective dead plates, and the means for moving the completed articles from the dead plates onto said conveyor, to the end that any selected units the number of which is "$n$" may be operated in properly synchronized time relation with other mechanisms above-recited and articles will be delivered upon said conveyor in equidistant spaced relation, and the distance between centers of adjacent articles on the conveyor will be $$\frac{1}{n}$$

times the distance between adjacent dead plates contiguous to the conveyor at one side thereof.

15. Apparatus for forming articles of glass, comprising a plurality of glass forming units, each adapted as a whole to occupy a fixed predetermined position and all being grouped about a point in vertical alignment with which glass charges to be supplied for distribution to all said units are separated from a source of molten glass, glass feeding mechanism for separating charges of molten glass from said source for distribution to all said units, a cullet funnel disposed centrally of the grouped units for receiving any charges of glass supplied by said feeding mechanism as are not distributed to one or another of said units for any reason, means for driving said feeding mechanism, a mechanical train driven by the feeding mechanism driving means for rotating said funnel, and mechanical driving means driven by the rotation of said funnel for controlling the timing of the various mechanisms of each of said units, whereby said feeding mechanism and all of said forming units may be synchronized each with the others, and whereby said funnel will be rotated so that charges of glass supplied eccentrically thereof will be received upon different and relatively cool portions of said funnel to prevent the heating of any portion of said funnel to such an extent that glass will adhere thereto.

KARL E. PEILER.
ALGY J. SMITH.